UNITED STATES PATENT OFFICE.

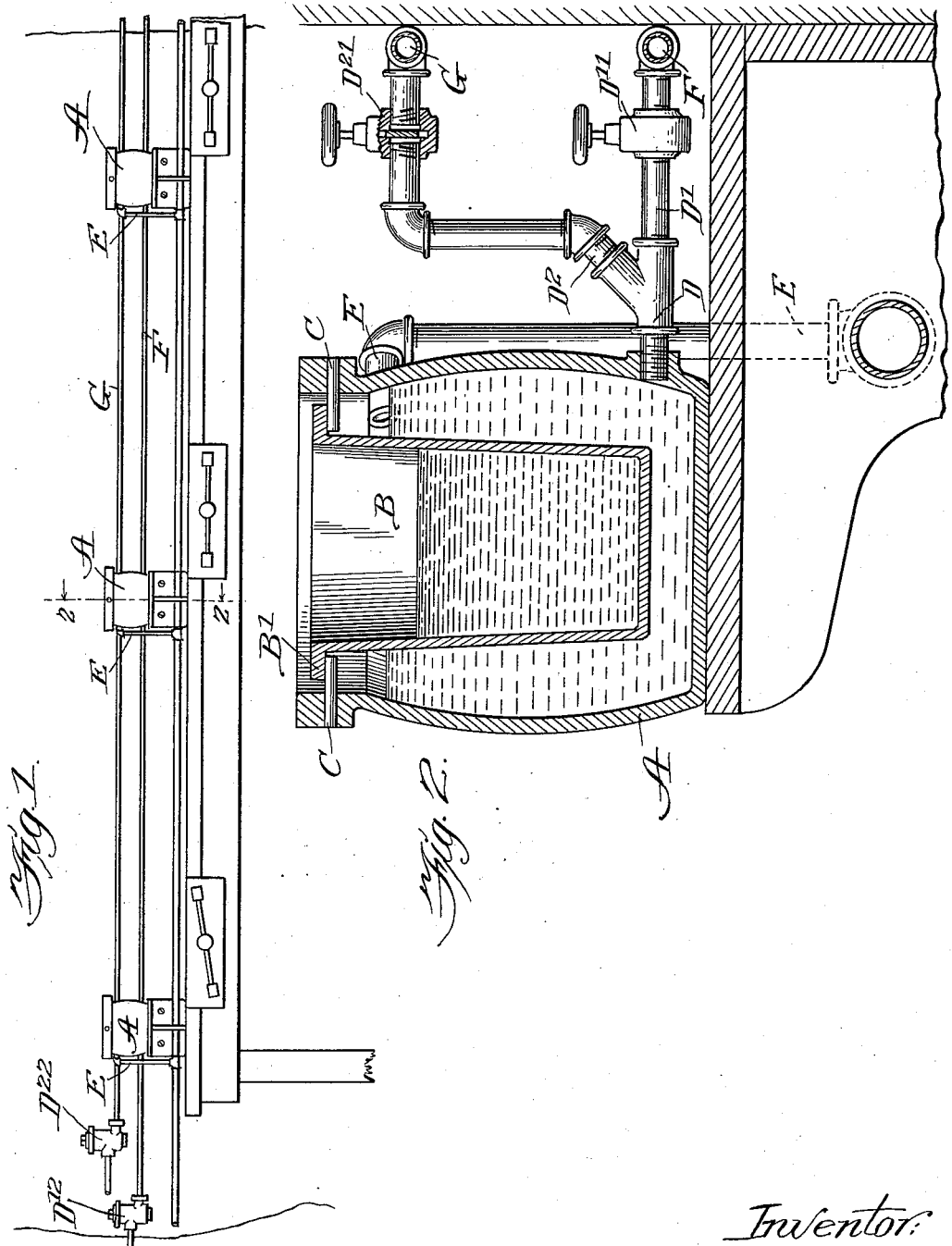

EMIL TYDEN, OF HASTINGS, MICHIGAN.

GLUE-HEATER.

1,013,336.  Specification of Letters Patent.  Patented Jan. 2, 1912.

Application filed December 1, 1910. Serial No. 595,071.

*To all whom it may concern:*

Be it known that I, EMIL TYDEN, a citizen of the United States, residing at Hastings, in the county of Barry and State of Michigan, have invented new and useful Improvements in Glue-Heaters, of which the following is a specification, reference being had to the accompanying drawings, forming a part thereof.

The purpose of this invention is to provide an improved form of steam-heated glue pot by furnishing, in combination therewith, means for positively regulating the pressure and quantity both of steam and water used for controlling the temperature of the glue.

In the drawings:—Figure 1 is an elevation of a bench fitted with glue pots embodying this invention. Fig. 2 is a sectional elevation of the same, section being made at the line 2—2 on Fig. 1.

Since the range of temperature in which the kind of glue employed by cabinet makers can be efficiently used is comparatively limited, some means of maintaining the temperature of the glue within proper limits is a necessary part of shop equipment. The common expedient has been to provide a jacket for the glue-containing vessel into which steam was conducted and allowed to condense, thus giving up its heat to the glue. This type of apparatus, however, requires constant attention, since the proper temperature of the glue is lower than the boiling point of water, the limits being between 135 degrees F. and 150 degrees F., and even a slight amount of overheating renders the glue practically worthless.

In the present device, water and steam are supplied in predetermined proportions and at definite pressures, the resulting warm water being contained in the usual form of jacket. Preferably, for convenience in construction and for insuring greater certainty of mixture of the steam and water and consequent impartation of the heat of the steam to the water and condensation of the steam before the latter has opportunity to escape through the water in the jacket, the water and steam pipes are brought together and the water and steam mixed exteriorly of the jacket, so that the resulting warm water enters the jacket through a single entrance aperture, as fully hereinafter described. A is the outer vessel provided to contain this heating water.

B is the inner vessel for the glue, having a flanged rim, $B^1$, which rests on lugs, C, projecting inwardly from the wall of the vessel, A. By this means, support is provided for the inner vessel without closure of the jacket space between the two.

The water inlet, D, consists of a Y-shaped pipe fitting, preferably entered in the lower portion of the side wall of the vessel, A, and having its branches, $D^1$ and $D^2$, respectively, connected with steam and water supply. Valves, $D^{11}$ and $D^{21}$, respectively, are provided for controlling closely the quantity of steam and water admitted into the jacket. Near the top of the vessel, an outlet or overflow pipe, E, is furnished to carry off surplus water. In the average shop, this will complete the equipment, since steam may be had from the boiler room at practically constant pressure, and water can be piped from the regular water supply also at constant pressure. If, however, these sources of supply are subject to fluctuation of pressure, the steam and water mains, F and G, may be provided each with an automatic pressure-regulating valve, $D^{12}$ and $D^{22}$, respectively. Then by experiment, the quantity-controlling valves, $D^{11}$ and $D^{21}$, may be adjusted to admit such proportions of steam and water as will result in a mixture of the desired temperature in the vessel, A; that is, a mixture having a temperature somewhere between 135° and 150° F. Since this is an open vessel, its contents being under atmospheric pressure merely, the pressures of steam and water utilized may be adjusted independently of each other, depending upon what can be conveniently obtained; and the automatic valves, $D^{12}$ and $D^{22}$, may be relied upon to maintain uniformity of the supply. For thorough uniformity of temperature, circulation of the water is made rapid enough to prevent any considerable radiation of heat.

I claim:—

1. In combination with a glue heater comprising a glue cup and a water jacket therefor, said water jacket having a free overflow; pipes connected for supplying, respectively, steam and water to the interior of the jacket; valves positioned for controlling the quantities of steam and water, respectively, admitted into the jacket, and means for maintaining the supplies of steam and water each at a constant pressure.

2. In combination with a glue heater comprising a glue cup and a water jacket therefor, said water jacket having a free overflow; pipes connected for supplying, respectively, steam and water to the interior of the jacket; valves positioned for controlling the quantities of steam and water, respectively, admitted into the jacket, and automatic pressure-regulating valves positioned to control the steam and water supplies respectively.

3. In a glue heater, the combination of a glue pot comprising a glue cup and a water jacket, said water jacket having a free overflow and valve-controlled pipes adapted to supply to said water jacket a regulable quantity of intermingled steam and water in variable proportions whereby the glue may be maintained at the desired temperature.

4. In a glue heater, the combination of a glue pot comprising a glue cup and a water jacket, said water jacket having a free overflow; an inlet pipe for the jacket having two branches outside the jacket, a valve in each branch, means for supplying steam and water to said branches and means for maintaining the supplies of steam and water each at a constant pressure.

5. In a glue heater, the combination of a glue pot comprising a glue cup and a water jacket, said water jacket having a free overflow; a Y-shaped pipe having its stem communicating with the interior of the jacket and having its branches disposed one above the other, a steam supply pipe connected to the lower branch, and a water supply pipe connected to the upper branch; means for independently varying the quantities of steam and water admitted into said branches respectively, and means for maintaining the supplies of steam and water, each at a constant pressure.

In testimony whereof, I have hereunto set my hand at Chicago, Illinois, this 29th day of November, 1910.

EMIL TYDEN.

Witnesses:
J. ELLIOTT,
M. GERTRUDE ADY.

---

Copies of this patent may be obtained for five cents each, by addressing the "Commissioner of Patents, Washington, D. C."